Feb. 14, 1967    W. H. BATEMAN ETAL    3,303,554

CUTTING TOOLS

Filed Jan. 4, 1965

United States Patent Office 3,303,554
Patented Feb. 14, 1967

3,303,554
CUTTING TOOLS
William Henry Bateman, Rickmansworth, and Harold Richard Bagley, Coventry, England, assignors to Wickman Wimet Limited, Coventry, England
Filed Jan. 4, 1965, Ser. No. 423,171
Claims priority, application Great Britain, Jan. 9, 1964, 1,001/64; Nov. 18, 1964, 46,910/64
5 Claims. (Cl. 29—103)

This invention relates to rotary hobbing tools for forming the teeth of gear wheels, splines, and analogous shapes, by the hob generating process.

In the process of cutting, for example, the teeth of gear wheels from cylindrical blanks by the hobbing process, there is conveniently employed a tool having one or more cutting forms extending helically around a cylindrical body which, when rotated about its axis in timed relationship to a rotating cylindrical workpiece, causes the cutting edges to successively operate upon the workpiece and to generate gear tooth forms, by translation of the tool in the direction of the workpiece axis, gear teeth of desired length are formed. The operative cutting edges of conventional gashed hobbing tools are spaced apart along the helical path at intervals at least adequate to provide access to tools for sharpening and re-sharpening the cutting edges by grinding. In use such hobs "scallop" the material from cylindrical blanks to form the spaces between adjacent teeth, and the depth of successive arcuate "scollops" increases proportionally to the rate of feed of the hob and to the spacing of the cutting edges.

Further, the load imposed upon each cutting edge restricts the useful life of such hobs and the intermittent engagement of cutting edges with the workpiece reduces heavy intermittent loading of the hobbing machine and particularly of the gear transmission.

These factors impose limitations upon the rate at which gear teeth can be formed by employment of conventional gashed hobs, and the object of this invention is to provide an improved hobbing tool.

In one aspect, the invention resides in a rotary hobbing tool having one or more helically extending peripheral cutting forms constituted entirely by close pitched cutting teeth.

The expression "close pitched cutting teeth" is used throughout this specification and claims to mean teeth the formation of which at such close pitch in conventional hobbing tools by the usual method of grinding would necessitate the employment of uneconomically small grinding wheels.

Figure 2:
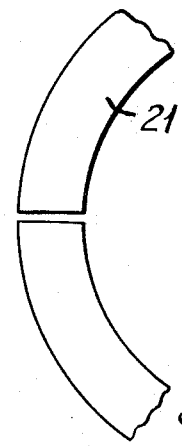
Figure 3:
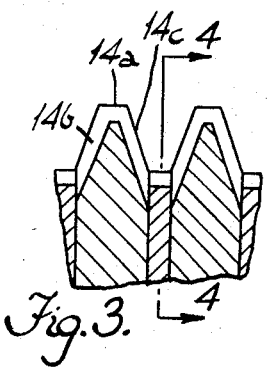
Figure 4:
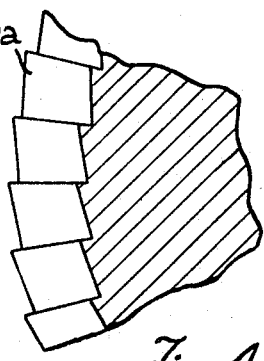
Figure 1:
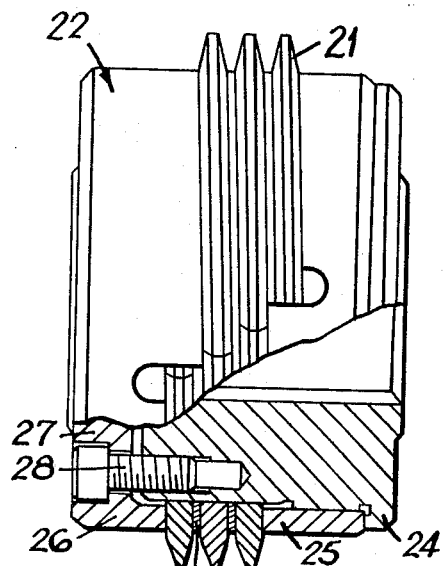

In the accompanying drawings, FIGURE 1 is a part sectional side view of a hob according to one example of the invention, FIGURE 2 is a fragmentary view of a ring shaped member used in FIGURE 1, FIGURE 3 is an enlarged view corresponding to part of FIGURE 1, but showing a different form of spacer and FIGURE 4 is a sectional view on the line 4—4 in FIGURE 3.

Referring to FIGURES 1 and 2, the hob shown is manufactured by forming from sintered hard metal such as tungsten carbide, a plurality of flat ring-shaped members 21. The members 21 are ground so that they are formed to the required cross-section and so that the operative surface of each member has thereon a continuous succession of close-pitched teeth (not shown). The members are then radially split as indicated in FIGURE 2 and are secured to a body 22 with split ring-shaped spacers 23 between the members, the arrangement being such that the operative surfaces of the members 21 are deformed so as to constitute a substantially continuous helically extending succession of close pitched teeth.

The members may be secured to the body 22 in a variety of manners, but in the example shown the body 22 is of cylindrical form with an outer diameter shaped to receive the members 21 and spacers 23. At one end the body includes an outwardly extending flange 24, and slidable on the body is a first sleeve 25 which bears against the flange 24. The members 21 and spacers 23 are assembled on the body with the splits of adjacent members 21 in abutting alignment, and are held on the body by a second sleeve 26 having at its end and remote from the sleeve 25 an inwardly extending flange 27 through which the sleeve 26 is secured to the body by a plurality of screws 28. The faces of the sleeves 25, 26 presented to the assembly of members and spacers are of helical form, so that when the sleeve 26 is secured to the body the members 21 will be deformed to the required extent to render the cutting edge substantially helical at the requisite pitch.

As shown in FIGURES 3 and 4, the spacers 23 in FIGURES 1 and 2 may themselves be formed with close pitched teeth 23a the shape of which determines the shape of the top of the teeth to be cut. The provision of teeth in the spacers 23 simplifies the form of the lower parts of the teeth 14, since the teeth 23a effectively become part of the teeth 14 in use.

It is found that tungsten carbide will deform to the required extent to form hobs of certain dimensions. However, the members 21 could be replaced by moulded helical members 31 which are pre-formed to approximately the desired shape and then deformed as explained above.

Conventional gashed hobs are formed with coarse pitched teeth although close-pitched teeth have considerable advantages. The reason for not utilising close-pitched teeth is the difficulty in forming them, and it will be appreciated that this difficulty is overcome by the examples described above. Moreover, the superior cutting and wear resisting properties of tungsten carbide-cobalt compositions and other so-called sintered hard metals, have not hitherto been fully utilised in hobbing tools, and the examples described above enable this to be done.

Having thus described our invention what we claim as new and desire to secure by Letters Patent is:

1. A hob having cutting teeth extending in a helical path, said hob including a body, and a plurality of radially split substantially ring-shaped members formed from a sintered hard metal, the teeth being formed upon said members, and means securing said members to said body and constraining said members on said body so that said teeth extend in the required helical path.

2. A hob as claimed in claim 1 in which each member is pre-formed to approximately the required configuration.

3. A hob as claimed in claim 1 in which the ring-shaped members are separated by radially split, ring-shaped spacers which are constrained to extend in a helical path.

4. A hob as claimed in claim 3 in which the spacers have formed thereon cutting teeth which effectively become part of the teeth on said members.

5. A hob for cutting toothed gears, comprising in combination a cylindrical body, a plurality of radially split substantially ring-shaped members formed from sintered hard metal and having cutting teeth formed thereon, and a pair of sleeves having their presented faces of helical form, the sleeves being secured to the body with the members clamped between the sleeves so that the teeth on said members extend in a continuous helical cutting path.

References Cited by the Examiner

UNITED STATES PATENTS

| | | | |
|---|---|---|---|
| 1,618,429 | 2/1927 | Head | 29—104 X |
| 2,703,446 | 3/1955 | Jensen | 29—104 X |

FOREIGN PATENTS

| | | |
|---|---|---|
| 1,043,881 | 6/1953 | France. |
| 1,285,040 | 2/1962 | France. |

WILLIAM W. DYER, Jr., *Primary Examiner.*

HARRISON L. HINSON, *Examiner.*